United States Patent
Kanehama et al.

(10) Patent No.: US 10,132,058 B2
(45) Date of Patent: Nov. 20, 2018

(54) COOLING FAN CONTROL DEVICE FOR CONSTRUCTION MACHINE

(71) Applicant: Hitachi Construction Machinery Co., Ltd., Bunkyo-ku, Tokyo (JP)

(72) Inventors: Mitsuhiko Kanehama, Tsuchiura (JP); Kensuke Sato, Tsuchiura (JP); Tsuyoshi Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 263 days.

(21) Appl. No.: 14/917,101

(22) PCT Filed: Nov. 17, 2014

(86) PCT No.: PCT/JP2014/080358
§ 371 (c)(1),
(2) Date: Mar. 7, 2016

(87) PCT Pub. No.: WO2015/133012
PCT Pub. Date: Sep. 11, 2015

(65) Prior Publication Data
US 2016/0201545 A1 Jul. 14, 2016

(30) Foreign Application Priority Data

Mar. 6, 2014 (JP) ................................ 2014-044191

(51) Int. Cl.
*F15B 21/04* (2006.01)
*E02F 9/22* (2006.01)
(Continued)

(52) U.S. Cl.
CPC ............... *E02F 9/226* (2013.01); *E02F 9/00* (2013.01); *E02F 9/0808* (2013.01);
(Continued)

(58) Field of Classification Search
CPC ...................................................... F15B 21/042
See application file for complete search history.

(56) References Cited

U.S. PATENT DOCUMENTS 3,659,419 A * 5/1972 Ikeda ..................... B60K 17/10
60/405
6,349,882 B1 2/2002 Kita et al.
(Continued)

FOREIGN PATENT DOCUMENTS

| EP | 1 944 483 A1 | 7/2008 |
|---|---|---|
| GB | 2 442 177 A | 3/2008 |

(Continued)

OTHER PUBLICATIONS

International Search Report (PCT/ISA/210) issued in PCT Application No. PCT/JP2014/080358 dated Jan. 6, 2015 with English translation (six pages).

(Continued)

*Primary Examiner* — F. Daniel Lopez
(74) *Attorney, Agent, or Firm* — Crowell & Moring LLP

(57) ABSTRACT

The purpose of the present invention is to provide a cooling fan control device for a construction machine, whereby the effects of heat caused by warm-up operation can be suppressed. This cooling fan control device is equipped with a control unit (10*a*) that controls the rotational speed of a cooling fan (21) in accordance with a main pump discharge pressure (P) detected by a main pump discharge pressure sensor (25), an engine cooling water temperature (Tw) detected by an engine cooling water temperature sensor (26), a hydraulic oil temperature (To) detected by a hydraulic oil temperature sensor (27), and an engine rotational speed (E) detected by an engine rotational speed sensor (28). The cooling fan (21) is rotated at the rotational speed controlled by the control unit (10*a*), thereby sending the generated cooling air to an oil cooler (19) and a control valve (13).

3 Claims, 6 Drawing Sheets

(51) Int. Cl.
*E02F 9/00* (2006.01)
*F01P 5/04* (2006.01)
*F15B 11/08* (2006.01)
*F15B 13/04* (2006.01)
*E02F 9/08* (2006.01)
*F01P 7/04* (2006.01)
*E02F 9/20* (2006.01)

(52) U.S. Cl.
CPC .......... *E02F 9/2095* (2013.01); *E02F 9/2292* (2013.01); *F01P 5/04* (2013.01); *F01P 7/044* (2013.01); *F15B 11/08* (2013.01); *F15B 13/0401* (2013.01); *F15B 21/042* (2013.01)

(56) References Cited

U.S. PATENT DOCUMENTS

| | | | |
|---|---|---|---|
| 2009/0145376 A1 | 6/2009 | Okuda et al. | |
| 2009/0217655 A1 | 9/2009 | Yabuki | |
| 2009/0217656 A1* | 9/2009 | Yoshimoto | E02F 9/226 |
| | | | 60/456 |
| 2010/0326067 A1* | 12/2010 | Weiser | E02F 9/226 |
| | | | 60/329 |
| 2012/0241235 A1 | 9/2012 | Shintani et al. | |

FOREIGN PATENT DOCUMENTS

| | | |
|---|---|---|
| JP | 5-171934 A | 7/1993 |
| JP | 11-241369 A | 9/1999 |
| JP | 11-269917 A | 10/1999 |
| JP | 2000-303838 A | 10/2000 |
| JP | 2006-322268 A | 11/2006 |
| JP | 4285866 B2 | 6/2009 |
| KR | 10-2010-0108618 | 10/2010 |
| WO | WO 2006/112091 A1 | 10/2006 |

OTHER PUBLICATIONS

Japanese-language Written Opinion (PCT/ISA/237) issued in PCT Application No. PCT/JP2014/080358 dated Jan. 6, 2015 (four pages).

Korean-language Office Action issued in counterpart Korean Application No. 10-2016-7004037 dated Feb. 17, 2016 (four (4) pages).

* cited by examiner

COOLING FAN CONTROL DEVICE FOR CONSTRUCTION MACHINE

TECHNICAL FIELD

The present invention relates to a cooling fan control device for a construction machine, which controls the rotational speed of a cooling fan provided to a construction machine, such as a hydraulic excavator.

BACKGROUND ART

Generally, a construction machine, such as a hydraulic excavator, is provided at an upper portion of a travel base, with a revolving frame interposed therebetween, and is equipped with: a revolving upperstructure that revolves horizontally; and a front working mechanism that is mounted forward of the revolving upperstructure so as to turn vertically. The revolving upperstructure has: an engine that is stored in an engine room; a main pump that is driven by the engine; and a control valve that controls the flow of the hydraulic oil discharged from the main pump.

Meanwhile, the front working mechanism has: an actuator that operates with the hydraulic oil supplied from the control valve; and a work body that is driven by the actuator, and work, such as drilling, is performed by the work body. At this time, the engine is driven, and the hydraulic oil is discharged as hydraulic fluid to the actuator from the main pump through the control valve, thereby causing a gradual increase in the temperature of engine cooling water and hydraulic oil.

In order to suppress such increase in the temperature of engine cooling water and hydraulic oil, there are provided within the revolving upperstructure a radiator for cooling engine cooling water, an oil cooler for cooling the hydraulic oil discharged from the main pump, and a cooling fan for cooling with cooling air generated by its rotation the engine cooling water and hydraulic oil circulating in the radiator and the oil cooler.

Furthermore, the construction machine is provided with a cooling fan control device so as to provide the most suitable cooling efficiency for various conditions and environments in the revolving upperstructure, the cooling fan control device being capable of adjusting the flow rate of the cooling air by controlling the rotational speed of the cooling fan. As one of such known cooling fan control devices, there has been proposed a control device for a hydraulically-driven cooling fan (for example, see Patent Literature 1), which is applied to a cooling fan provided independently from the engine and is equipped with: a detection unit that detects a state quantity, to be described later, associated with the driving of the cooling fan; and a control unit that controls the rotational speed of the cooling fan on the basis of the state quantity detected by the detection unit.

More specifically, in the related-art control device for the hydraulically-driven cooling fan, engine cooling water temperature, hydraulic oil temperature, and engine rotational speed are used as the state quantity associated with the driving of the cooling fan. The control unit stores data on a target fan rotational speed corresponding to each of the engine cooling water temperature, the hydraulic oil temperature, and the engine rotational speed, and makes comparisons between the target fan rotational speed corresponding to the detected engine cooling temperature and the target fan rotational speed corresponding to the detected hydraulic oil temperature to select the higher target fan rotational speed, and then makes comparisons between the selected target fan rotational speed and the target fan rotational speed corresponding to the detected engine rotational speed so as to control the rotational speed of the cooling fan in accordance with the lower target fan rotational speed. Furthermore, an upper limit to the cooling fan rotational speed is set in accordance with the engine cooling water temperature and the hydraulic oil temperature.

Therefore, in the case where the above-described related-art control device for the hydraulically-driven cooling fan is applied to a hydraulic excavator, upon changes in engine load due to work, such as drilling, the cooling fan is controlled to a fixed rotational speed in accordance with engine cooling temperature and hydraulic oil temperature, and thus insufficient cooling or overcooling by the cooling fan can be suppressed. If work is conducted by a hydraulic excavator in an environment, such as a cold climate area, where engine cooling water temperature and hydraulic oil temperature are likely to decrease, on the other hand, the warm-up operation, such as bucket crowd relief, in which the bucket is moved in the crowding direction to increase the load on the main pump, is performed in order to quickly increase the engine cooling water temperature and the hydraulic oil temperature and bring the operation of the vehicle body in good condition.

CITATION LIST

Patent Literature

Patent Literature 1: Japanese Patent No. 4285866

SUMMARY OF INVENTION

Technical Problem

However, in the control device for the hydraulically-driven cooling fan according to the related art disclosed in the Patent Literature 1, in such environments as described above where engine cooling water temperature and hydraulic oil temperature are likely to decrease, in order to avoid overcooling, the rotational speed of the cooling fan is limited to the low rotational speed at which the cooling capacity is reduced in accordance with the engine cooling temperature and the hydraulic oil temperature. Therefore, if the above-described warm-up operation, such as bucket crowd relief, is maintained for a fixed period of time, the hydraulic oil temperature rises suddenly.

As a result, when the portion of the control valve in the vicinity of the oil passage through which hydraulic oil circulates is raised in temperature relative to another portion of the control valve, resulting in temperature differences in the control valve, the portion raised in temperature is subjected to the effects of heat, such as heat expansion, so that a main spool in the control valve becomes likely to stick. In the event that the main spool sticks, there is a possibility that, even if the warm-up operation is finished and a pilot lever is operated, another actuator unused in the warming-up operation does not work, or even if another actuator works, it does not stop when the pilot lever is returned. Therefore, there is concern that the front working mechanism cannot be moved as intended by an operator.

Accordingly, the present invention has been made in view of such circumstances in the related art, and an object of the present invention is to provide a cooling fan control device for a construction machine, whereby the effects of heat caused by the warm-up operation can be suppressed.

Solution to Problem

To achieve the above-mentioned object, a cooling fan control device for a construction machine according to the present invention is provided to the construction machine including: an engine; a main pump that is driven by the engine; a control valve that controls the flow of hydraulic oil discharged from the main pump; an actuator that operates with the hydraulic oil supplied from the control valve; a radiator that cools engine cooling water for cooling the engine; an oil cooler that cools the hydraulic oil discharged from the main pump; a first cooling fan that cools with cooling air generated by its rotation the engine cooling water circulating in the radiator; and a second cooling fan that is provided independently from the engine and cools with cooling air generated by its rotation the hydraulic oil circulating in the oil cooler. The cooling fan control device includes: a detection unit that detects a state quantity associated with driving of the cooling fan; and a control unit that controls rotational speed of the second cooling fan on the basis of the state quantity detected by the detection unit. The state quantity includes an engine cooling water temperature, a hydraulic oil temperature, and an engine rotational speed. The detection unit includes: an engine cooling water temperature sensor that detects the engine cooling water temperature; a hydraulic oil temperature sensor that detects the hydraulic oil temperature; and an engine rotational speed sensor that detects the engine rotational speed. The cooling fan control device is characterized in that: the state quantity includes a main pump discharge pressure; the detection unit includes a main pump discharge pressure sensor that detects the main pump discharge pressure; the control valve is disposed in a flow path of the cooling air generated by the rotation of the second cooling fan; and the control unit controls the rotational speed of the second cooling fan in accordance with the main pump discharge pressure detected by the main pump discharge pressure sensor, the engine cooling water temperature detected by the engine cooling water temperature sensor, the hydraulic oil temperature detected by the hydraulic oil temperature sensor, and the engine rotational speed detected by the engine rotational speed sensor.

Advantageous Effects of Invention

In the cooling fan control device for the construction machine according to the present invention, the control unit controls the rotational speed of the second cooling fan on the basis of the main pump discharge pressure, engine cooling water temperature, hydraulic oil temperature, and engine rotational speed as the state quantity associated with the driving of the second cooling fan and sends the cooling air to the control valve. Therefore, even if the warm-up operation is performed in an environment, such as a cold climate area, where the engine cooling water temperature and the hydraulic oil temperature are likely to decrease, the heat in the control valve can be sufficiently diffused. Thus, local heat generation in the control valve is prevented and the effects of heat caused by the warm-up operation can be suppressed. It is therefore possible to avoid sticking of the main spool in the control valve and maintain higher operational performance of the front working mechanism than is conventional.

DESCRIPTION OF EMBODIMENT

Hereinafter, a cooling fan control device for a construction machine according to an embodiment of the present invention will be described with reference to the accompanying drawings.

Figure 1:
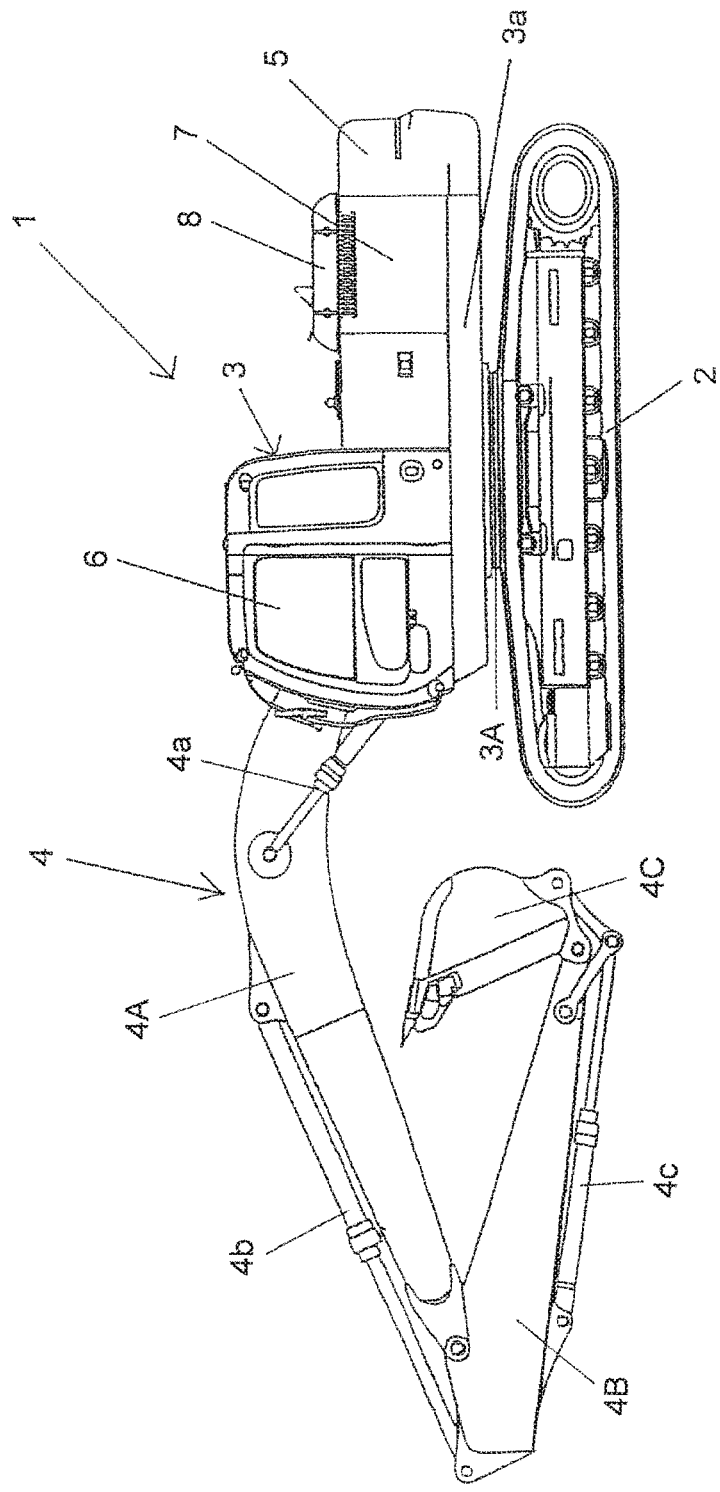
FIG. 1 is a diagram showing a hydraulic excavator as an example of the construction machine equipped with a cooling fan control device according to an embodiment of the present invention.

The cooling fan control device for a construction machine according to the embodiment of the present invention is applied to a construction machine, for example, a hydraulic excavator 1 shown in FIG. 1. The hydraulic excavator 1 is composed of: a travel base 2; a revolving upperstructure 3 that is disposed on the upper side of the travel base 2 and has a revolving frame 3a; a revolving device 3A that is interposed between the travel base 2 and the revolving upperstructure 3 and revolves the revolving upperstructure 3; and a front working mechanism 4 that is mounted forward of the revolving upperstructure 3 and swings vertically.

The front working mechanism 4 is composed of: a boom 4A that has a base end swingably mounted to the revolving frame 3a and swings vertically; an arm 4B that is swingably mounted to the leading end of the boom 4A; and a bucket 4C that is swingably mounted to the leading end of the arm 4B. The above-described revolving upperstructure 3 is equipped with: a counterweight 5 that is disposed, for example, in the rear of the vehicle body and maintains balance of the vehicle body; a cab 6 that is disposed on the left side, forward of the vehicle body, in which an operator sits to operate the front working mechanism 4; an engine room 7 that is disposed between the counterweight 5 and the cab 6; and a vehicle body cover 8 that is provided at an upper portion of the engine room 7 and forms the exterior of an upper portion of the vehicle body. It should be noted that the revolving upperstructure 3 is provided with an inlet, not shown, which allows the inflow of outside air.

Figure 2:
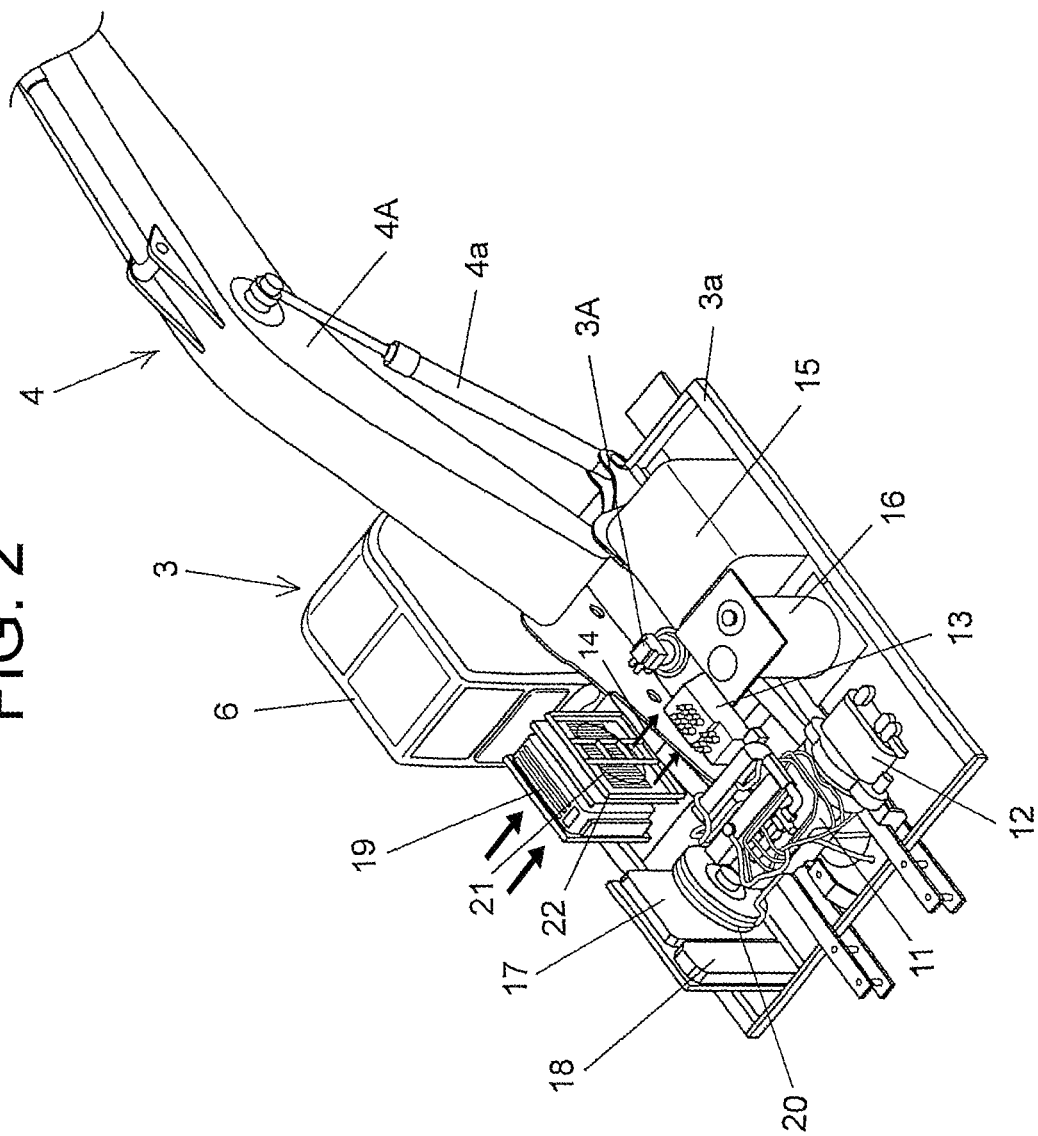
FIG. 2 is a diagram illustrating the internal structure of a revolving upperstructure shown in FIG. 1, particularly illustrating a positional relationship among cooling fans, a radiator, an oil cooler, and a control valve.
Figure 3:
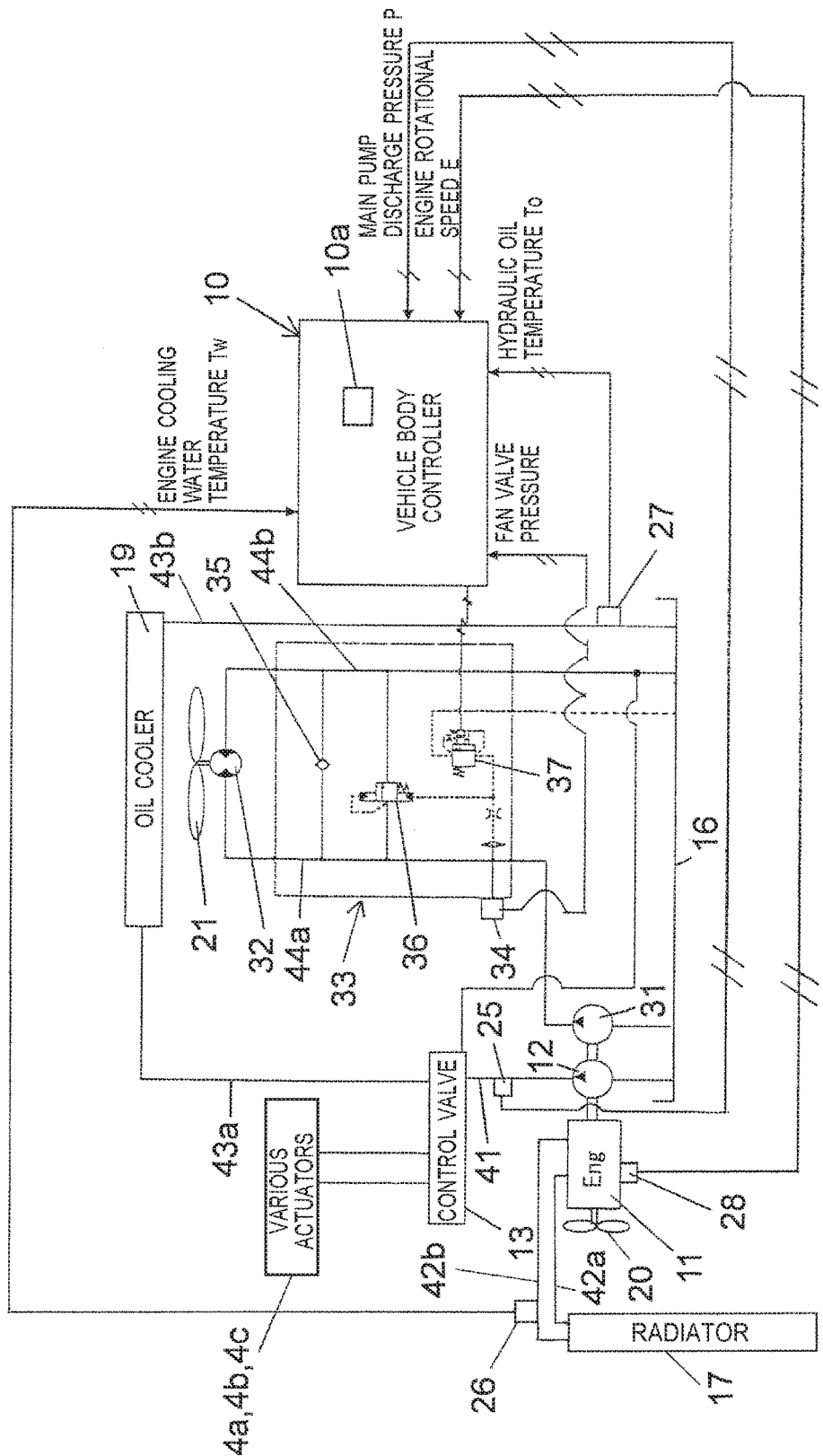
FIG. 3 is a diagram showing a configuration of the cooling fan control device for the construction machine according to the embodiment of the present invention.

As shown in FIGS. 2 and 3, the revolving upperstructure 3 is equipped with: a vehicle body controller 10 that controls the operation of the vehicle body; an engine 11 that is stored in the engine room 7; a turbocharger (not shown) that supercharges the air to the engine 11; a main pump 12 that is connected to the output shaft of the engine 11 and driven by the engine; and a control valve 13 that is connected to the main pump 12 through a pipeline 41 and controls the flow of the hydraulic oil discharged from the main pump 12. The control valve 13 has a main spool, not shown, which controls the flow direction and flow rate of hydraulic oil in an actuator with the stroke thereof.

The revolving upperstructure 3 is also equipped with an actuator that operates with the hydraulic oil supplied from the control valve 13. The actuator includes: a boom cylinder 4a that interconnects the revolving upperstructure 3 and the boom 4A and swings the boom 4A with the telescopic motion thereof; an arm cylinder 4b that is disposed on the upper side of the boom 4A so as to interconnect the boom 4A and the arm 4B and swing the arm 4B with the telescopic motion thereof; and a bucket cylinder 4c that interconnects the arm 4B and the bucket 4C and swings the bucket 4C with the telescopic motion thereof.

Further, the revolving upperstructure 3 is equipped with: a fuel tank 15 that is disposed on the right side, forward of the engine 11 and stores the fuel to be supplied to the engine 11; a hydraulic oil tank 16 that is disposed rearward of the fuel tank 15 and stores the hydraulic oil to be sucked into the main pump 12; a radiator 17 that is disposed on the left of the engine 11 and cools engine cooling water for cooling the engine 11; and an intercooler 18 that is disposed adjacent to the rear of the radiator 17 and cools the air supercharged by the turbocharger. Furthermore, the engine 11 and the radiator 17 are interconnected by pipelines 42a and 42b so that the engine cooling water cooled by the radiator 17 flows through the pipelines 42a and 42b and circulates between the engine 11 and the radiator 17.

The revolving upperstructure 3 is equipped with an oil cooler 19 that is disposed between the radiator 17 and the cab 6 and cools the hydraulic oil discharged from the main pump 12. The oil cooler 19 and the control valve 13 are interconnected by a pipeline 43a, and the oil cooler 19 and the hydraulic oil tank 16 are interconnected by a pipeline 43b. Thus, the hydraulic oil returned to the control valve 13 from the boom cylinder 4a, the arm cylinder 4b, and the bucket cylinder 4c, flows through the pipeline 43a into the oil cooler 19 for cooling, and then flows through the pipeline 43b and returns to the hydraulic oil tank 16.

In addition, the revolving upperstructure 3 is equipped with a first cooling fan 20 and a second cooling fan 21. The first cooling fan 20 is provided at a side portion of the engine 11 toward the radiator 17, and cools the engine cooling water circulating in the radiator 17 and the air in the intercooler 18 with cooling air generated by its rotation which is caused by a drive from the engine 11. The second cooling fan 21 is provided independently from the engine 11, and cools with cooling air generated by its rotation the hydraulic oil circulating in the oil cooler 19.

In the embodiment, the control valve 13 is disposed in a flow path 14 (as indicated by arrows in FIG. 2) of the cooling air generated by the rotation of the cooling fan 21. For example, the control valve 13 is disposed forward of the engine 11, and the cooling fan 21 is mounted on the side of the oil cooler 19 on which the control valve 13 is disposed, with a fan shroud 22 interposed therebetween, so as to be disposed to face the control valve 13.

The embodiment is equipped with: a detection unit that detects a state quantity, to be described later, associated with the driving of the cooling fan 21; and a control unit 10a that controls the rotational speed of the cooling fan 21 on the basis of the state quantity detected by the detection unit. More specifically, the above-described state quantity (see FIG. 4) associated with the driving of the cooling fan 21 includes a main pump discharge pressure P, an engine cooling water temperature Tw, a hydraulic oil temperature To, and an engine rotational speed E. The detection unit includes: a main pump discharge pressure sensor 25 that detects the main pump discharge pressure P; an engine cooling water temperature sensor 26 that detects the engine cooling water temperature Tw; a hydraulic oil temperature sensor 27 that detects the hydraulic oil temperature To; and an engine rotational speed sensor 28 that detects the engine rotational speed E.

The main pump discharge pressure sensor 25 is provided to the pipeline 41 interconnecting the main pump 12 and the control valve 13, and the engine cooling water temperature sensor 26 is provided to the pipeline 42b interconnecting the engine 11 and the radiator 17. Furthermore, the hydraulic oil temperature sensor 27 is provided to the pipeline 43b interconnecting the oil cooler 19 and the hydraulic oil tank 16, and the engine rotational speed sensor 28 is provided to the engine 11. The above-described control unit 10a is stored within the vehicle body controller 10.

The control unit 10a is configured to control the rotational speed of the cooling fan 21 in accordance with the main pump discharge pressure P detected by the main pump discharge pressure sensor 25, the engine cooling water temperature Tw detected by the engine cooling water temperature sensor 26, the hydraulic oil temperature To detected by the hydraulic oil temperature sensor 27, and the engine rotational speed E detected by the engine rotational speed sensor 28. When the cooling fan 21 rotates at the rotational speed controlled by the control unit 10a, outside air is taken in through the inlet of the revolving upperstructure 3 as cooling air, cools the oil cooler 19 at this time, and then is sent to the control valve 13.

The embodiment is equipped with: a fan pump 31 that is driven by the main pump 12; a hydraulic motor 32 that rotates the cooling fan 21 with the hydraulic oil discharged from the fan pump 31; a pipeline 44a that interconnects the fan pump 31 and the hydraulic motor 32 and causes the hydraulic oil to flow from the fan pump 31 to the hydraulic motor 32; a pipeline 44b that interconnects the hydraulic motor 32 and the hydraulic oil tank 16 and returns the hydraulic oil from the hydraulic motor 32 to the hydraulic oil tank 16; a fan valve 33 that is provided to the pipelines 44a and 44b and controls the flow rate of the hydraulic oil discharged from the fan pump 31 according to control commands from the control unit 10a; and a fan valve pressure sensor 34 that detects the pressure of the hydraulic oil circulating in the fan valve 33 from the fan pump 31 to the hydraulic motor 32. The fan valve pressure sensor 34 is provided to the pipeline 44a interconnecting the fan pump 31 and the hydraulic motor 32, and is configured to input the detected pressure to the control unit 10a.

The fan valve 33 has: a check valve 35 that has one end connected to the pipeline 44a and the other end connected to the pipeline 44b, and is opened to return hydraulic oil from the pipeline 44b to the pipeline 44a when the pressure in the pipeline 44a is lower than that in the pipeline 44b; a relief valve 36 that has one end connected to the pipeline 44a and the other end connected to the pipeline 44b, and causes hydraulic oil to flow from the pipeline 44a to the pipeline 44b, thereby limiting the pressure in the pipeline 44a to a predetermined relief pressure; and a proportional solenoid valve 37 that receives control commands from the control unit 10a and changes the relief pressure of the relief valve 36. The hydraulic oil in the pipeline 44a is supplied to the relief valve 36 and the proportional solenoid valve 37 through a throttle.

Figure 4:
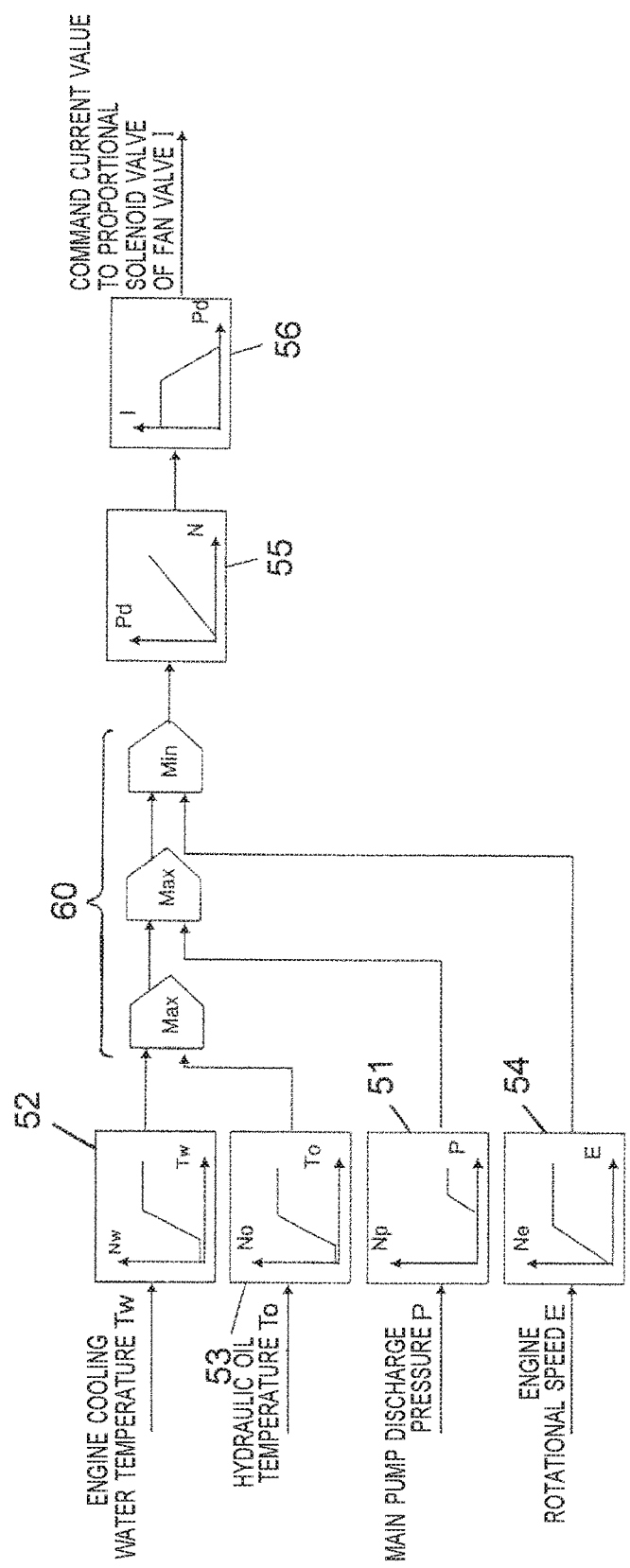
FIG. 4 is a diagram illustrating a configuration of a control unit of a vehicle body controller shown in FIG. 3.

As shown in FIG. 4, the control unit 10a has: a first setting unit 51 in which the relationship between the main pump discharge pressure P and a target fan rotational speed Np is preset; and a first calculation unit (not shown) that calculates the target fan rotational speed Np on the basis of the relationship between the main pump discharge pressure P and the target fan rotational speed Np, set by the first setting unit 51, and the main pump discharge pressure P detected by the main pump discharge pressure sensor 25. The control unit 10a also has: a second setting unit 52 in which the relationship between the engine cooling water temperature Tw and a target fan rotational speed Nw is preset; and a second calculation unit (not shown) that calculates the target fan rotational speed Nw on the basis of the relationship between the engine cooling water temperature Tw and the target fan rotational speed Nw, set by the second setting unit 52, and the engine cooling water temperature Tw detected by the engine cooling water temperature sensor 26.

Further, the control unit 10a has: a third setting unit 53 in which the relationship between the hydraulic oil temperature To and a target fan rotational speed No is preset; and a third calculation unit (not shown) that calculates the target fan rotational speed No on the basis of the relationship between the hydraulic oil temperature To and the target fan rotational speed No, set by the third setting unit 53, and the hydraulic oil temperature To detected by the hydraulic oil temperature sensor 27. The control unit 10a also has: a fourth setting unit 54 in which the relationship between the engine rotational speed E and a target fan rotational speed Ne is preset; and a fourth calculation unit (not shown) that calculates the target fan rotational speed Ne on the basis of the relationship between the engine rotational speed E and the target fan rotational speed Ne, set by the fourth setting unit 54, and the engine rotational speed E detected by the engine rotational speed sensor 28.

Furthermore, the control unit 10a includes a selection unit 60 that makes comparisons among the target fan rotational speed Np calculated by the first calculation unit, the target fan rotational speed Nw calculated by the second calculation unit, and the target fan rotational speed No calculated by the third calculation unit to select the highest one, and then makes comparisons between the selected target fan rotational speed and the target fan rotational speed Ne calculated by the fourth calculation unit to select the lowest one as a final target fan rotational speed N.

Figure 5:
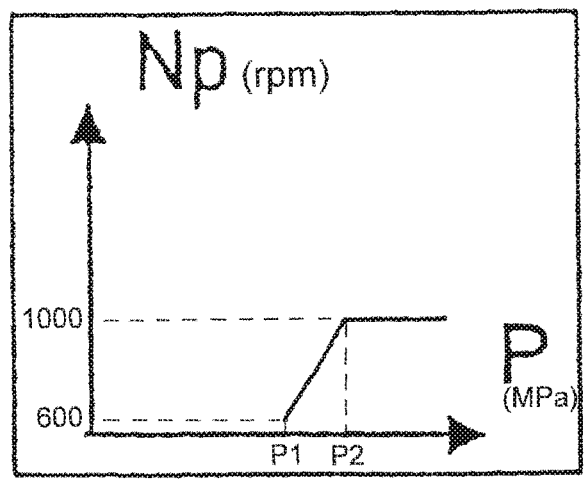
FIG. 5 is an enlarged view showing the relationship between a main pump discharge pressure and a target fan rotational speed in a first setting unit shown in FIG. 4.

More specifically, the selection unit 60 is configured to select the target fan rotational speed Np calculated by the first calculation unit, for example when the engine cooling water temperature Tw detected by the engine cooling water temperature sensor 26 is a predetermined first temperature T1 or less (see FIG. 6), the hydraulic oil temperature To detected by the hydraulic oil temperature sensor 27 is a predetermined second temperature T2 or less (see FIG. 7), and the main pump discharge pressure P detected by the main pump discharge pressure sensor 25 is a predetermined pressure P1 or more (see FIG. 5).

Here, in the embodiment, the relationship between the main pump discharge pressure P and the target fan rotational speed Np in the first setting unit 51, the relationship between the engine cooling water temperature Tw and the target fan rotational speed Nw in the second setting unit 52, the relationship between the hydraulic oil temperature To and the target fan rotational speed No in the third setting unit 53, and the relationship between the engine rotational speed E and the target fan rotational speed Ne in the fourth setting unit 54 are set so that the target fan rotational speeds Np, Nw, No, and Ne increase in accordance with an increase in the main pump discharge pressure P, the engine cooling water temperature Tw, the hydraulic oil temperature To, and the engine rotational speed E, in order to prevent, for example, a rise in the engine cooling water temperature Tw and the hydraulic oil temperature To or overheating of the engine 11.

Therefore, the relationship between the main pump discharge pressure P and the target fan rotational speed Np in the first setting unit 51 is, for example as shown in FIG. 5, set to such a proportional relation that the target fan rotational speed Np increases from a predetermined minimum value (for example, 600 rpm) to a maximum value to be described later in accordance with an increase in the main pump discharge pressure P. When the main pump discharge pressure P is the predetermined pressure P1, the target fan rotational speed Np is set to a minimum value of 600 rpm. When the main pump discharge pressure P is a predetermined pressure P2 (>P1) or more, the target fan rotational speed Np is set to a maximum value to be described later.

Figure 6:
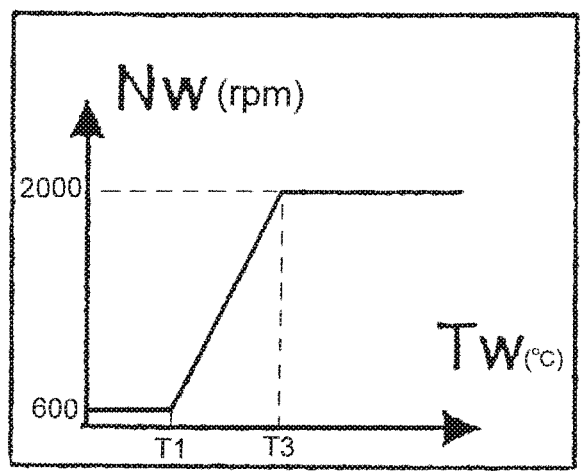
FIG. 6 is an enlarged view showing the relationship between an engine cooling water temperature and a target fan rotational speed in a second setting unit shown in FIG. 4.

Furthermore, the relationship between the engine cooling water temperature Tw and the target fan rotational speed Nw in the second setting unit 52 is, for example as shown in FIG. 6, set to such a proportional relation that the target fan rotational speed Nw increases from a minimum value (for example, 600 rpm) to a maximum value (for example, 2000 rpm) in accordance with an increase in the engine cooling water temperature Tw. When the engine cooling water temperature Tw is the predetermined first temperature T1 or less, the target fan rotational speed Nw is set to a minimum value of 600 rpm. When the engine cooling water temperature Tw is a predetermined third temperature T3 (>T1) or more, the target fan rotational speed Nw is set to a maximum value of 2000 rpm.

Figure 7:
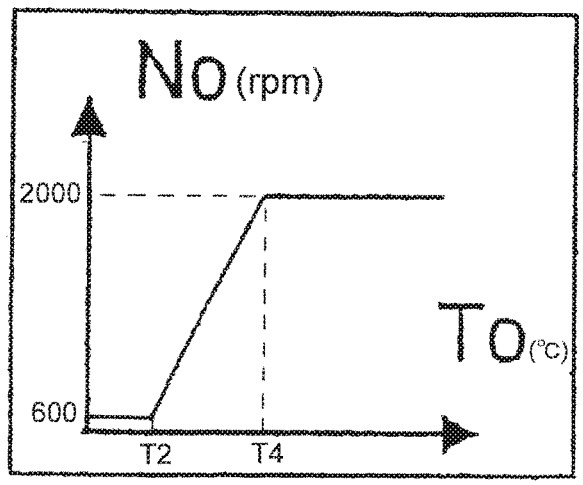
FIG. 7 is an enlarged view showing the relationship between a hydraulic oil temperature and a target fan rotational speed in a third setting unit shown in FIG. 4.

Further, the relationship between the hydraulic oil temperature To and the target fan rotational speed No in the third setting unit 53 is, for example as shown in FIG. 7, set to such a proportional relation that the target fan rotational speed No increases from a minimum value (for example, 600 rpm) to a maximum value (for example, 2000 rpm) in accordance with an increase in the hydraulic oil temperature To. When the hydraulic oil temperature To is the predetermined second temperature T2 or less, the target fan rotational speed No is set to a minimum value of 600 rpm. When the hydraulic oil temperature To is a predetermined fourth temperature T4 (>T2) or more, the target fan rotational speed No is set to a maximum value of 2000 rpm.

Figure 8:
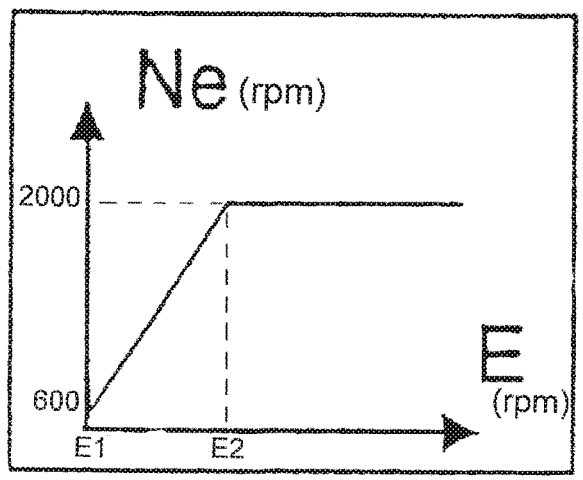
FIG. 8 shows an enlarged view showing the relationship between an engine rotational speed and a target fan rotational speed in a fourth setting unit shown in FIG. 4.

Further, the relationship between the engine rotational speed E and the target fan rotational speed Ne in the fourth setting unit 54 is, for example as shown in FIG. 8, set to such a proportional relation that the target fan rotational speed Ne increases from a minimum value (for example, 600 rpm) to a maximum value (for example, 2000 rpm) in accordance with an increase in the engine rotational speed E. When the engine rotational speed E is a predetermined rotational speed E1, the target fan rotational speed Ne is set to a minimum value of 600 rpm. When the engine rotational speed E is a predetermined rotational speed E2 (>E1) or more, the target fan rotational speed Ne is set to a maximum value of 2000 rpm.

Furthermore, in the embodiment, the target fan rotational speed Np corresponding to the main pump discharge pressure P greater than or equal to the predetermined pressure P1, set by the first setting unit 51, is limited to approximately half (for example, in the range of 800 to 1200 rpm) of the maximum value 2000 rpm of each of the target fan rotational speeds Nw, No, and Ne set respectively by the second setting unit 52, the third setting unit 53, and the fourth setting unit 54. That is, in the relationship between the main pump discharge pressure P and the target fan rotational speed Np in the first setting unit 51 as described above, the maximum value of the target fan rotational speed Np falls within the range of 800 to 1200 rpm, and is set to, for example, 1000 rpm.

The control unit 10a also has: a fifth setting unit 55 in which the relationship between the final target fan rotational speed N and a target relief pressure Pd is preset; and a fifth calculation unit (not shown) that calculates the target relief pressure Pd on the basis of the relationship between the final target fan rotational speed N and the target relief pressure Pd, set by the fifth setting unit 55, and the final target fan rotational speed N selected by the selection unit 60.

Further, the control unit 10a has: a sixth setting unit 56 in which the relationship between the target relief pressure Pd and a command current value I is preset; and a sixth calculation unit (not shown) that calculates the command current value I on the basis of the relationship between the target relief pressure Pd and the command current value I, set by the sixth setting unit 56, and the target relief pressure Pd calculated by the fifth calculation unit. The command current value I calculated by the sixth calculation unit is output to the proportional solenoid valve 37 of the fan valve 33.

Next, control of the rotational speed of the cooling fan 21 during the warm-up operation will be described in detail.

In the embodiment, the main pump discharge pressure sensor 25, the engine cooling water temperature sensor 26, the hydraulic oil temperature sensor 27, and the engine rotational speed sensor 28 detect the main pump discharge pressure P, the engine cooling water temperature Tw, the hydraulic oil temperature To, and the engine rotational speed E, respectively, as the state quantity associated with the driving of the cooling fan 21.

Here, when the hydraulic excavator 1 is placed in an environment, such as a cold climate area, where the engine cooling water temperature Tw and the hydraulic oil temperature To are likely to decrease, the bucket crowd relief, in which the bucket 4C of the front working mechanism 4 is moved in the crowding direction to increase the load on the main pump 12, is performed as the warm-up operation in order to bring the operation of the vehicle body in good condition. When the main pump discharge pressure P is thus increased and the main pump discharge pressure P detected by the main pump discharge pressure sensor 25 becomes, for example, the predetermined pressure P1 or more, the first calculation unit of the control unit 10a of the vehicle body controller 10 determines the target fan rotational speed Np (600 rpm≤Np≤1000 rpm) from the relationship between the main pump discharge pressure P and the target fan rotational speed Np, set by the first setting unit 51, and the main pump discharge pressure P (≥P1) detected by the main pump discharge pressure sensor 25.

Furthermore, the bucket crowd relief also requires an increase in the engine rotational speed E. Therefore, when the engine rotational speed E detected by the engine rotational speed sensor 28 becomes, for example, the predetermined rotational speed E2 or more, the fourth calculation unit of the control unit 10a of the vehicle body controller 10 determines the target fan rotational speed Ne (2000 rpm maximum) from the relationship between the engine rotational speed E and the target fan rotational speed Ne, set by the fourth setting unit 54, and the engine rotational speed E (≥E2) detected by the engine rotational speed sensor 28.

Meanwhile, since the engine cooling water temperature Tw detected by the engine cooling water temperature sensor 26 is the predetermined first temperature T1 or less, the second calculation unit of the control unit 10a of the vehicle body controller 10 determines the target fan rotational speed Nw (600 rpm minimum) from the relationship between the engine cooling water temperature Tw and the target fan rotational speed Nw, set by the second setting unit 52, and the engine cooling water temperature Tw (≤T1) detected by the engine cooling water temperature sensor 26. Furthermore, since the hydraulic oil temperature To detected by the hydraulic oil temperature sensor 27 is the predetermined second temperature T2 or less, the third calculation unit of the control unit 10a of the vehicle body controller 10 determines the target fan rotational speed No (600 rpm minimum) from the relationship between the hydraulic oil temperature To and the target fan rotational speed No, set by the third setting unit 53, and the hydraulic oil temperature To (≤T2) detected by the hydraulic oil temperature sensor 27.

In addition, the selection unit 60 of the control unit 10a of the vehicle body controller 10 makes comparisons among the target fan rotational speed Np (600 rpm≤5 Np≤1000 rpm) calculated by the first calculation unit, the target fan rotational speed Nw (600 rpm minimum) calculated by the second calculation unit, and the target fan rotational speed No (600 rpm minimum) calculated by the third calculation unit to select the target fan rotational speed Np (600 rpm≤Np≤1000 rpm) calculated by the first calculation unit, which is the highest target fan rotational speed. Then the selection unit 60 makes comparisons between the selected target fan rotational speed Np (600 rpm≤5 Np≤1000 rpm) and the target fan rotational speed Ne (2000 rpm maximum) calculated by the fourth calculation unit to select, as the final target fan rotational speed N, the target fan rotational speed Np (600 rpm≤Np≤1000 rpm) calculated by the first calculation unit, which is the lowest target fan rotational speed. That is, the selection unit 60 selects the target fan rotational speed Np corresponding to the main pump discharge pressure P, as the final target fan rotational speed N.

Then the fifth calculation unit of the control unit 10a of the vehicle body controller 10 calculates the target relief pressure Pd from the relationship between the final target fan rotational speed N and the target relief pressure Pd, set by the fifth setting unit 55, and the final target fan rotational speed N selected by the selection unit 60. In addition, the sixth calculation unit of the control unit 10a of the vehicle body controller 10 calculates the command current value I from the relationship between the target relief pressure Pd and the command current value I, set by the sixth setting unit 56, and the target relief pressure Pd calculated by the fifth calculation unit, and then outputs the calculated command current value I to the proportional solenoid valve 37 of the fan valve 33.

Thus, when the proportional solenoid valve 37 changes the relief pressure of the relief valve 36 according to the received command current value I, the pressure in the pipeline 44a interconnecting the fan pump 31 and the hydraulic motor 32 is adjusted to the changed relief pressure, so that the hydraulic motor 32 rotates the cooling fan 21 at the rotational speed corresponding to the main pump discharge pressure P. Therefore, the cooling air taken into the revolving upperstructure 3 through the inlet and generated by the cooling fan 21 is sent to the oil cooler 19 and the control valve 13.

According to the embodiment constituted in this manner, even under low temperature conditions where the engine cooling water temperature Tw is the predetermined first temperature T1 or less and the hydraulic oil temperature To is the predetermined second temperature T2 or less, the control unit 10a of the vehicle body controller 10 can increase the rotational speed of the cooling fan 21 above a minimum value of 600 rpm in accordance with an increase in the main pump discharge pressure P, which is caused by the bucket crowd relief performed as the warm-up operation. Thus, the heat generated in the control valve 13 can be sufficiently diffused by sending the cooling air generated by the cooling fan 21 in the revolving upperstructure 3 to the control valve 13 facing the cooling fan 21.

Therefore, the generation of heat in the vicinity of an oil passage through which hydraulic oil flows in the control valve 13 is suppressed, and the difference in temperature between the vicinity of the oil passage and another portion can be alleviated, thereby allowing a reduction in the effects of heat, such as heat expansion, in the control valve 13, caused by the warm-up operation. This allows smooth strokes of the main spool in the control valve 13, and it is therefore possible to avoid the main spool from sticking and maintain high operational performance of the front working mechanism 4.

Moreover, in the embodiment, when the bucket crowd relief is performed in an environment, such as a cold climate area, where the engine cooling water temperature Tw and the hydraulic oil temperature To are likely to decrease, the selection unit 60 selects the target fan rotational speed Np corresponding to the main pump discharge pressure 25 as the rotational speed of the cooling fan 21. However, when work, such as digging, is actually performed by the hydraulic excavator 1 after the end of the bucket crowd relief, and thus the engine cooling water temperature Tw and the hydraulic oil temperature To rise, the target fan rotational speed Nw and No calculated respectively by the second calculation unit and the third calculation unit exceed the upper limit (1000 rpm) of the target fan rotational speed Np calculated by the first calculation unit, and therefore the selection unit 60 selects, as the final target fan rotational speed N, the target fan rotational speed corresponding to the engine cooling water temperature Tw, the hydraulic oil temperature To, or the engine rotational speed E. Consequently, the control unit 10a of the vehicle body controller 10 allows the selection unit 60 to smoothly switch the rotational speed of the cooling fan 21 to the target fan rotational speed corresponding to each state quantity before and after the end of the bucket crowd relief is finished. Thus, a stable operating condition of the cooling fan 21 is obtained even immediately after the end of the bucket crowd relief, thereby allowing the hydraulic excavator 1 to quickly start work, such as digging.

Furthermore, in the embodiment, when the bucket crowd relief is performed in an environment, such as a cold climate area, where the engine cooling water temperature Tw and the hydraulic oil temperature To are likely to decrease, and the main pump discharge pressure P detected by the main pump discharge pressure sensor 25 increases to the predetermined pressure P1 or more, the selection unit 60 of the control unit 10a of the vehicle body controller 10, as described above, selects the target fan rotational speed Np (600 rpm≤Np≤2000 rpm) corresponding to the main pump discharge pressure P in the first setting unit 51 in preference to the target fan rotational speeds Nw (600 rpm minimum), No (600 rpm minimum), and Ne (2000 rpm maximum) corresponding respectively to the engine cooling water temperature Tw, the hydraulic oil temperature To, and the engine rotational speed E in the second to fourth setting units 52 to 54. Thus, the proportional solenoid valve 37 and the relief valve 36 of the fan valve 33 are actuated, resulting in an increase in the pressure in the pipeline 44a interconnecting the fan pump 31 and the hydraulic motor 32 and an increase in the driving force of the hydraulic motor 32, thereby allowing easy control of the rotational speed of the cooling fan 21 in accordance with an increase in the main pump discharge pressure P. Therefore, the cooling air can be properly sent to the control valve 13 at a suitable flow rate for diffusing the heat in the control valve 13 caused by the bucket crowd relief, thereby allowing an improvement in the diffusion efficiency of the heat in the control valve 13.

Further, in the embodiment, because the target fan rotational speed Np corresponding to the main pump discharge pressure P greater than or equal to the predetermined pressure P1, set by the first setting unit 51, is limited to 1000 rpm, the cooling fan 21 does not rotate at the rotational speed exceeding the upper limit 1000 rpm even if the bucket crowd relief is performed as the warm-up operation and the rotational speed of the cooling fan 21 is controlled by the control unit 10a so as to correspond to the main pump discharge pressure P. That is, it is possible to rotate the cooling fan 21 in a sufficient range required for diffusing the heat in the control valve 13 resulting from the bucket crowd relief. Thus, with the rotational operation of the cooling fan 21, the load on the engine 11 can be reduced, thereby allowing an improvement in the fuel efficiency of the hydraulic excavator 1.

It should be understood that the above-described embodiment has been described in detail so as to make the present invention understandable, but not limited to the configuration including all elements described above. Further, a part of configuration of one embodiment may be replaced with a part of configuration of another embodiment, and a part of the configuration of another embodiment may be added to the configuration of the embodiment.

REFERENCE SIGNS LIST

1 Hydraulic excavator (construction machine)
3 Revolving upperstructure
3A Revolving device
4 Front working mechanism
4A Boom
4B Arm
4C Bucket
4a Boom cylinder
4b Arm cylinder
4c Bucket cylinder
10 Vehicle body controller
10a Control unit
11 Engine
12 Main pump
13 Control valve
17 Radiator
18 Intercooler
19 Oil cooler
20, 21 Cooling fan
25 Main pump discharge pressure sensor
26 Engine cooling water temperature sensor
27 Hydraulic oil temperature sensor
28 Engine rotational speed sensor
31 Fan pump
32 Hydraulic motor
33 Fan valve
34 Fan valve pressure sensor
35 Check valve
36 Relief valve
37 Proportional solenoid valve
41, 42a, 42b, 43a, 43b, 44a, 44b Pipeline
51 First setting unit
52 Second setting unit
53 Third setting unit
54 Fourth setting unit 55 Fifth setting unit
56 Sixth setting unit
60 Selection unit

The invention claimed is:

1. A construction machine, comprising:
an engine;
a main pump that is driven by the engine;
a control valve that controls a flow of hydraulic oil discharged from the main pump;
an actuator that operates with the hydraulic oil supplied from the control valve;
a radiator that cools engine cooling water for cooling the engine;
an oil cooler that cools the hydraulic oil discharged from the main pump;
a first cooling fan that cools with cooling air generated by its rotation the engine cooling water circulating in the radiator; and
a second cooling fan that is provided independently from the engine and cools with cooling air generated by its rotation the hydraulic oil circulating in the oil cooler;
an engine cooling water temperature sensor that detects an engine cooling water temperature;
a hydraulic oil temperature sensor that detects a hydraulic oil temperature;
an engine rotational speed sensor that detects an engine rotational speed;
a vehicle body controller that is adapted to control a rotational speed of the second cooling fan on the basis of values detected respectively by the engine cooling water temperature sensor, the hydraulic oil temperature sensor, and the engine rotational speed sensor; and
a main pump discharge pressure sensor that detects a main pump discharge pressure, wherein
the control valve is disposed in a flow path of the cooling air generated by the rotation of the second cooling fan, and
the vehicle body controller is further adapted to
calculate three target fan rotational speeds based on the main pump discharge pressure detected by the main pump discharge pressure sensor, the engine cooling water temperature detected by the engine cooling water temperature sensor, and the hydraulic oil temperature detected by the hydraulic oil temperature sensor,
make comparisons between the highest target fan rotational speed among the calculated three target fan rotational speeds and a target fan rotational speed calculated based on the engine rotational speed detected by the engine rotational speed sensor so as to select the lower target fan rotational speed therebetween, and
control the rotational speed of the second cooling fan.

2. The construction machine according to claim 1, wherein the vehicle body controller is further adapted to select the highest target fan rotational speed among the calculated three target fan rotational speeds when the engine cooling water temperature detected by the engine cooling water temperature sensor is a predetermined first temperature or less, the hydraulic oil temperature detected by the hydraulic oil temperature sensor is a predetermined second temperature or less, and the main pump discharge pressure detected by the main pump discharge pressure sensor is a predetermined pressure or more.

3. The construction machine according to claim 2, wherein the target fan rotational speed corresponding to the main pump discharge pressure greater than or equal to the predetermined pressure, set by the vehicle body controller, is limited to approximately half of a maximum value of each of the target fan rotational speeds set based on the engine cooling water temperature detected by the engine cooling water temperature sensor, the hydraulic oil temperature detected by the hydraulic oil temperature sensor, and the engine rotational speed detected by the engine rotational speed sensor.

* * * * *